Aug. 25, 1931. S. RAGE 1,820,325
COOKER WITH HEAT AND PRESSURE
Filed July 10, 1929
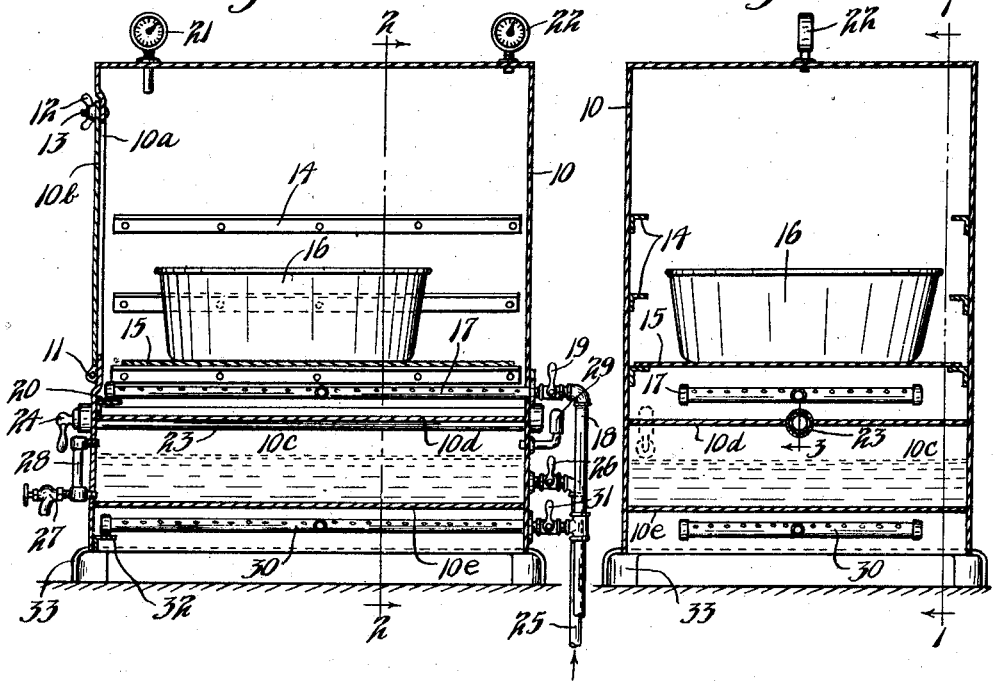
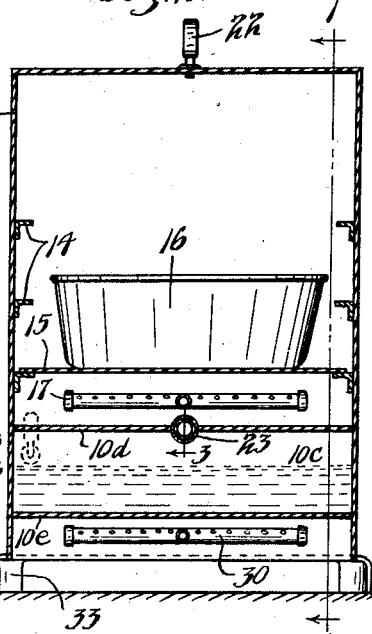
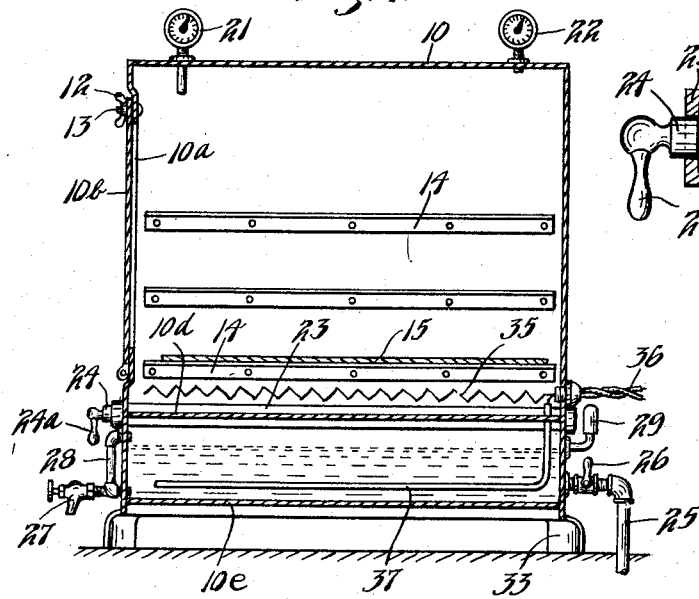
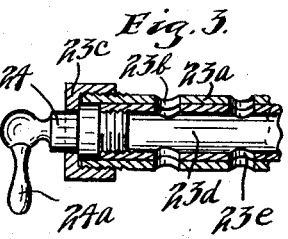
INVENTOR.
SOFUS RAGE.
BY HIS ATTORNEYS.

Patented Aug. 25, 1931

1,820,325

UNITED STATES PATENT OFFICE

SOFUS RAGE, OF MINNEAPOLIS, MINNESOTA

COOKER WITH HEAT AND PRESSURE

Application filed July 10, 1929. Serial No. 377,194.

This invention relates to a cooking device, and particularly to such a device in the nature of an oven or retort. As is well known, most ranges and stoves are provided with an oven, but this is supplied only with dry heat. It is desirable in cooking many things to have a retort to which steam may be delivered so that the temperature may be maintained in a moist atmosphere or pressure cooking by steam may be carried on.

It is an object of this invention, therefore, to provide a cooking device of simple and efficient construction which can be used to cook either with dry heat and thus form an oven of the ordinary type and which can also be used as a steam retort.

It is a further object of the invention to provide a cooking device, which may form an attachment to a standard stove, and comprising a chamber forming an oven chamber with heating means therefor, a water containing chamber below said oven chamber, together with means for heating said water containing chamber, the same communicating with said first mentioned chamber whereby steam may be supplied to said latter chamber.

It is more specifically an object of the invention to provide a cooking device comprising a chamber having means for supporting a cooking vessel therein with a burner therebelow for heating said chamber, a water containing chamber beneath said first mentioned chamber, means for opening and closing communication between said water containing chamber and said first mentioned chamber, a burner beneath said water containing chamber and means for supplying water to and dispensing water from said water containing chamber whereby said device may constitute either a dry oven, a steam retort or a water heating means for supplying hot water.

These and other objects and advantages of the invention will be fully set forth in the following description made in connection with the accompanying drawings, in which like reference characters refer to similar parts throughout the several views, and in which:—

Fig. 1 is a vertical section taken on line 1—1 of Fig. 2 as indicated by the arrows;

Fig. 2 is a vertical section taken on line 2—2 of Fig. 1 as indicated by the arrows;

Fig. 3 is a partial view taken substantially on line 3—3 of Fig. 2 as indicated by the arrows, and Fig. 4 is a view similar to Fig. 1 showing a modification.

Referring to the drawings, a device is shown comprising a casing 10 of substantially rectangular shape in cross section forming a chamber which casing has an opening 10a at one side for giving access to said chamber, said opening being adapted to be closed by a hinged door 10b swingable on the hinge pintles 11 and adapted to be closed tightly, the nuts 12 shown as wing nuts engaging screws 13 which project about opening 10a. The chamber in casing 10 is thus adapted to be very tightly closed to form a steam retort. Casing 10 has at opposite sides thereof angle members 14 secured to its inner sides in vertically spaced relation on the opposite pairs of which may be supported a shelf 15 adapted to support any suitable cooking vessel 16. A burner 17 is disposed at the bottom of the chamber in casing 10, which in the embodiment of the invention shown in Figs. 1 and 2 is illustrated as a gas burner adapted to be supplied with gas by a conduit 18, a regulating and shut-off valve 19 being disposed between said conduit and burner. Burner 17 may be supported at the end opposite conduit 18 by an angle bracket 20 secured to the wall of casing 10. A pressure gauge 21 is shown as mounted at the top and one side of casing 10 and a temperature gauge or thermometer 22 is shown as mounted at the top and other side thereof.

Below the casing in the upper part of chamber 10 is disposed a water containing chamber 10c formed within casing 10 and having a top wall 10d and a bottom wall 10e. One or more valve members 23 may be provided extending through the top wall 10d, the same comprising an outer cylindrical member 23a having spaced radial holes 23b therethrough and having a closing cap 23c at each end thereof. An inner tube 23d fits in tube 23a and is likewise provided with a plurality of radially spaced holes 23e adapted to move into and out of alignment with holes 23b. Pipe 23d has a member 24 secured thereto, said member having a reduced portion threaded into the end of pipe 23d. Member 24 is provided with an operating handle 24a disposed outside of casing 10 as shown in Fig. 1. A water supplying conduit 25 is provided communicating with chamber 10c which also is equipped with a regulating and shut-off valve 26. A drain or water discharging faucet 27 is secured to casing 10 communicating with the bottom of chamber 10c and a water gauge 28 extends from said faucet upwardly at one side of said chamber and at the exterior thereof. A safety valve member 29 is carried by casing 10 and communicates with chamber 10c. A burner 30 is disposed below the bottom plate 10e, the same being supplied with gas by the conduit 18, a valve 31 being provided to regulate and shut-off the supply of gas to said burner. Said burner 30 is shown as supported upon an angle bracket 32 secured to one side of casing 10. While casing 10 may be variously supported, in the embodiment of the invention illustrated it is shown as having downwardly extending flanges or leg members 33 at the corners thereof.

In operation water will be supplied to the chamber 10c as shown in Figs. 1 and 2. If it is desired to use the chamber in the top of casing 10 merely as an oven, only the burner 17 will be lighted and operated. Suitable vessels, as vessel 16, can then be placed on the shelf 15 and the contents thereof heated as is customary in the ordinary oven. If it is desired to cook with steam under pressure or to maintain a moist atmosphere in the upper chamber, burner 30 will be operated and handle 24a swung to afford communication between chamber 10c and the chamber thereabove. Steam may thus be generated in chamber 10c and will pass through the openings 23e and 23b into the upper chamber. Considerable steam pressure can be generated and both burners 17 and 30 may be operated if desired. The temperature and pressure can be observed on the gauges 21 and 22 and the pressure and temperature can be regulated by regulating the burners. It will be seen that chamber 10c can be used as a means for heating water to have a hot water supply and this hot water can conveniently be drawn from faucet 27. The blow-off valve 29 can of course be set to the pressure desired and the level of water in chamber 10c will be indicated in the water tube or glass 28.

In Fig. 4 substantially the same structure is shown except that an electrical heating element 35 is substituted for the burner 17 which heating element will be supplied with current by the conductors 36 which may be connected to any suitable supply of current. Electrical heating elements 37 are also provided in casing 10c, which may be supplied with current by conductors 36. It is obvious that electrical heaters can be used if desired instead of the gas burners.

From the above description it is seen that applicant has provided a simple and efficient cooking device which may constitute either a dry heat oven or a steam retort, or in which the atmosphere may be kept in a saturated or moist condition. As stated, if it is not desired to use the chamber 10c for supplying vapor or steam, valve member 23 may be operated to close communication between chamber 10c and the upper chamber. Chamber 10c can as stated also be used as a hot water supply means. The device is quite simple and can be supplied as an attachment to standard stoves and ranges, particularly the modern gas range. It is obvious that the device will have a high degree of utility for the purpose intended.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A cooking device comprising a chamber, a door opening into said chamber and adapted to be tightly closed whereby said chamber may constitute a retort, means for supporting a vessel in said chamber, a burner in said chamber below said means, a water containing chamber below said burner, and a burner below said water containing chamber, said water containing chamber having openings into said first mentioned chamber and means for covering and uncovering said openings whereby said chamber can be used either as a dry oven or as a steam retort.

2. A cooking device comprising an upper chamber, means for affording access to said chamber, said chamber being adapted to be tightly closed to constitute a steam retort, an adjustable shelf in said chamber for supporting a vessel thereon, a burner within and adjacent the bottom of said chamber and beneath said shelf, a water containing chamber below and substantially coextensive with said first mentioned chamber, means for supplying water to said water containing chamber, a water discharge means leading from said chamber, a valve extending longitudinally of said water containing chamber at the top thereof and adapted to open and close communication therefrom to said first mentioned chamber, and a burner disposed beneath said water containing chamber whereby said water containing chamber may be used as a boiler to supply steam to said first mentioned chamber when said valve is open or the same may be used as a hot water supply chamber.

3. A cooking device comprising a chamber, a door giving access to said chamber and adapted to be tightly closed whereby said chamber may constitute a retort, a regulatable burner at the bottom of said chamber, a water containing chamber below said first mentioned chamber substantially coextensive therewith, a burner below said water containing chamber and valve means at the top of said water containing chamber for closing or opening communication between said chambers, whereby said first mentioned chamber may be used as an oven with dry heat from said first mentioned burner or may be used as a pressure retort and supplied with steam from said water containing chamber.

In testimony whereof I affix my signature.

SOFUS RAGE.